Patented Nov. 23, 1948

2,454,393

UNITED STATES PATENT OFFICE 2,454,393

MILES-PER-GALLON METER

Charles Anthony Leonard, Cincinnati, Ohio

Application April 24, 1944, Serial No. 532,425

11 Claims. (Cl. 73—114)

The present invention relates to engine performance meters, particularly automotive engines either of the stationary or of the mobile type as when employed on auto vehicles, automobiles, trucks, Diesel locomotives, motor boats and the like.

When determining the efficiency of a fuel-supplied engine as an automotive power unit or steam engine, it is desirable to know at any particular instant the ratio between the rate of fuel consumed and the speed of the power shaft, the distance traveled by the automotive vehicle per unit of time or the output of the prime mover. These ratios may be specified as miles-per-gallon, R. P. M. per gallon, foot-pounds or kilowatts per gallon or any other suitable indicia.

In the past, it has been customary in the design of a miles-per-gallon meter to obtain the fuel consumption factor from a float-measuring device and to derive the speed factor from the car generator in terms of voltage, then combining these two factors through a complicated mechanical-electrical system to give a composite reading of these factors. Structures of this character are usually expensive in that they involve many parts and in general have to be especially designed for each particular installation and use. The presence of so many parts also detracts from the reliability of operation.

The primary object of the invention is to provide an engine performance meter, specifically a miles-per-gallon indicator, which will be of simple construction, necessitating inexpensive parts and having the maximum reliability of operation.

Another object is to provide an improved miles-per-gallon meter which can be readily adapted to any kind of power installation which utilizes all sorts of fuel such as gasoline, Diesel oil, or steam and may be readily installed without any special provision or change in structure of the engine under test.

Still another object is to provide a miles-per-gallon meter which may be used in connection with automobile and truck engines and can be positioned on the dash so as readily to be observed by the driver and thus give indications as to the instantaneous performance of the engine.

Another object is to provide an engine performance meter which may be readily installed on an engine utilizing any type of fuel, liquid or gaseous, and which will give indications as to whether or not the engine is performing at its optimum efficiency for given operating conditions.

The above objects are attained in brief by providing a pair of individually operated cams, one of which is actuated in accordance with power output of the engine as reflected for example, by the speed of the crank shaft or the axle. The other cam is actuated in accordance with rate of fuel flow. The relative motion of the cams are compositely integrated to indicate a ratio by a pointer which is structurally related to the cams and moves compositely in response to the movements of both cams. The cams are actuated preferably by thermostatic members under the control of a fuel flow meter and a speedometer or tachometer respectively.

The invention will be better understood when reference is made to the following description and the accompanying drawings in which:

Fig. 1 is a fragmentary plan view of the improved miles-per-gallon meter.

Fig. 2 is a diagrammatical view showing the meter of Fig. 1 connected in circuit with a gasoline flow meter, and a car speed generator.

Fig. 3 is a diagrammatical view somewhat similar to Fig. 2 except that the car speed generator is replaced by a rotary make-or-break device or commutator secured to the speedometer drive.

Figure 4 is a schematic view showing the manner in which the improved indicator may be used to control the brilliancy of a lamp for telling at a glance whether or not the vehicle is being operated at optimum efficiency.

Referring more particularly to Fig. 1, reference character 1 designates a base of any suitable material which may be housed in a casing (not shown) having a sight opening. There is a pair of bearing brackets 2, 3 held by screws or otherwise secured to the base and which provide bearings 2a and 3a respectively for receiving the rotating elements of the meter. These latter may comprise cams 4, 5 carried on pins or shafts and are adapted to rotate in opposite directions as indicated. The hair springs 6, 7 respectively are provided for the cams each having one end secured to one of the brackets 2, 3 and the other end being secured to the pins or shafts of the rotary cams. These springs serve to rotate the cams against the restraining effect of a pair of stops as will be explained presently.

A pointer 8 is pivotally mounted as indicated at 8a on the cam 4 and overlies the face of cam 5. There is an elongated slot 8b provided in the pointer for receiving a roller 9 secured to the cam 5 so that the movement of the pointer is affected by rotation of both cams to integrate the relative movements of the cams. The lower end of the pointer is adapted to swing over a caligasoline flow meter increases. Thus, the current flowing through the wire 23 which energizes the coil 18 of the fuel consumption cam 5 will tend to permit movement of the cam clockwise (Fig. 1) as the bi-metallic element 14 flexes inwardly.

The car speed cam 4 is actuated by a conventional speedometer S having a rotary make-and-break switch or commutator 30 and a brush 31. The brush is in circuit through a wire 35 with the primary winding 32 of an induction coil having a secondary winding 33. The lower end of the primary winding is connected by a conductor 34 to the ungrounded side of the battery 25.

The commutator segments 30 are connected through a wire 36 to the ground 22. Thus, as the speed of the car increases, the time interval between each make-and-break is shortened by reason of the increase in speed of the speedometer shaft, and the inductive effect on the secondary coil 33 increases. The current through the secondary coil accordingly increases.

The secondary winding 33 has its terminals connected by conductors 37, 38 respectively to the terminals 16, 17 of the meter 1. The induced currents in the secondary winding acting through the heating coil 15 of the bi-metallic element 13 causes the car speed cam 4 to rotate in a counter-clockwise direction thus tending to swing the pointer 8 to a higher miles-per-gallon rate on scale 10.

The movements imparted to the pointer 8 are such that the car speed is continuously and automatically divided by the rate of fuel flow with the result that the exact reading of miles-per-gallon is indicated at every given instant, the same being denoted by the instantaneous difference in the movements of the cams 4 and 5.

It is also apparent that this reading is accurate under all conditions of vehicle speed, under all changes of load or changes in efficiency of the engine. The operator of the car therefore need only watch the movements of the pointer 8 and in order to obtain the optimum performance of the engine he should run the vehicle at that speed which is indicated by the pointer as giving the highest mileage per gallon.

A small dash light may also be utilized which, when operated at maximum brilliancy would indicate the optimum position of the pointer, but a dimming or interruption in the light would be a signal that the engine was not giving its maximum efficiency. A structure of this character has been illustrated in Figure 4 in which a resistor is indicated at 40. The pointer 8 is adapted to move over the resistor and make contact with the individual turns thereof. A conductor 41 is connected to a terminal 42 on the resistor at a position which represents optimum operating efficiency in terms of the movement of the pointer 8. The conductor 41 connects with a lamp 43, a battery 44 and a conductor 45. The latter is connected to the pointer at 46. As the pointer moves to the left to indicate increased mileage per gallon and to have greater efficiency of operation, the resistance between the end of the pointer and the point 42 becomes less. The lamp 43 will therefore glow brighter as the efficiency is increased.

While I have disclosed my invention as pertaining more particularly to a miles-per-gallon meter, it is evident that the same principles of operation are readily applicable to other efficiency determining factors of engines in general.

Many other forms and adaptations of the improved device will occur to those skilled in the art so that I do not desire to limit my invention to the exact form shown in the drawing but rather to depend upon the claims to determine the scope of the invention.

Having thus fully described my invention, what I claim as new and desire to secure by Letters Patent is:

1. An efficiency meter comprising a plurality of independently movable members, first thermo-electric means responsive to the instantaneous rate of fuel supplied to the engine for moving one of said members, second thermo-electric means and independent from the first thereof responsive to the instantaneous speed of the engine for moving another of said members, and a pointer connected with said members and responsive to the combined movement of said members for indicating the instantaneous efficiency of said engine.

2. A miles and like meter for an autovehicle comprising in combination a fuel flow meter and a speed indicating device, a plurality of rotatable members, thermo-electric means responsive to the rate of flow through said meter for rotating one of said members, thermo-electric means responsive to said speed indicating device for rotating another of said members, and means for combining the relative movements of said members into a single movement, and means for indicating the amount of said last mentioned movement in terms of the distance traveled by said autovehicle per unit of fuel used.

3. A meter for indicating the ratio factor of the fuel consumption rate of an engine and the corresponding speed of the engine, a plurality of cams, thermo-electric means responsive to said rate for operating one of said cams, thermo-electric means responsive to speed for operating another of said cams, and an indicator responsive to the combined movement of said cams for determining said ratio factor.

4. An engine efficiency meter comprising plurality of movable cams adapted to rotate in opposite directions, bi-metallic actuators for operating said cams respectively, coils adapted to cause said actuators to flex and to move said cams, means for delivering current to one of said coils in accordance with the instantaneous rate of fuel flow to said engine, and means for supplying current to the other of said coils in accordance with the instantaneous speed of the engine, and means for correlating the movements of said cams into a composite movement to give an integrated effect by which the efficiency performance of the engine may be indicated.

5. A meter for indicating efficiency comprising a plurality of plates adapted to rotate and positioned adjacent one another, each of said plates being provided with a recess which constitutes a camming surface, heat operated mechanism including rollers which are adapted to roll about said camming surfaces respectively to rotate said plates, means for delivering to one of said mechanisms heating effects in accordance with the rate of fuel flow to the engine, and means for delivering heating effects to the other of said mechanisms in accordance with the speed of the engine, and means for determining the relative movements of said plates and for translating said movements into an indication of engine efficiency.

6. A mileage and like meter for a vehicle engine comprising a base having an index scale, a pair of rotatable cams on said base, each cam having a recess provided with an undercut wall extending inwards from said periphery, a pointer cooperating with said scale and pivoted on one of said cams, said pointer having an elongated slot therein and overlying the other cam, a projection secured to said other cam and slidable in the slot whereby rotation of either or both cams will correspondingly shift the pointer, and bi-metallic means for rotating said cams in opposite directions in order to move said pointer, and means electrically responsive to the rate of fuel flow to the engine and also to the speed of the engine for controlling said bi-metallic means whereby said pointer indicates the distance per fuel unit derived from the engine.

7. A mileage and like meter for an automotive vehicle comprising a plurality of cams, means including bi-metallic means for actuating one of said cams in accordance with the rate of fuel flow to the engine of the vehicle, and other means including bi-metallic means for operating another of said cams in accordance with the speed of the vehicle, said other means including an electric generator which is driven by said vehicle and delivers a voltage in accordance with the speed thereof, and means for translating the composite movements of said cams into an indication by which the distance traveled by the vehicle per unit of fuel may be indicated.

8. An efficiency meter comprising a plurality of plates adapted to rotate in opposite directions, said plates being provided respectively with camming surfaces, bi-metallic actuators cooperating respectively with said camming surfaces for rotating one of said plates in accordance with the rate of fuel supplied to an engine and for rotating another of said plates in accordance with the speed of the engine, and means for integrating the relative movements of the plates in terms of a composite movement, and means for translating the composite movement into indications from which the efficiency of the engine can be determined.

9. An efficiency meter comprising a plurality of rotatable plates, there being camming recesses provided respectively in said plates, rollers adapted to engage the surface of the respective recesses, and means for actuating the rollers, said means constituting combined thermal and electric mechanisms which are responsive to each of the rate of fuel flow to an engine and the speed of the engine, and means for translating the composite movement of the plates into a movement of an indicator which registers instantaneous efficiency.

10. In a device for indicating distance to volume of fuel consumption, the combination with a pair of means, one means including a thermoelectric device responsive to speed and the other means including a thermo-electric device responsive to the rate of fuel delivered for consumption, an indicator for integrating the relationship therebetween, a pair of independent actuators for said indicator, each actuator including a preloaded cam, and release means for each cam and responsive to one of the first mentioned means.

11. In an instrument for indicating the ratio of the speed of an engine to its fuel consumption, a dial and a pointer movable thereover, a pair of independently movable actuators connected with said pointer for movement of the pointer by changes in position of either actuator, thermal responsive means connected with each actuator and responsive to temperature changes for changing the position of the associated actuator, and independent means for changing the temperature of said thermal responsive means comprising electric heating elements associated with said thermal responsive means and means for supplying electric current to one of said heating elements in accordance with the speed of said engine, and to the other thereof in accordance with the rate of fuel consumption of said engine.

CHARLES ANTHONY LEONARD.

REFERENCES CITED

The following references are of record in the file of this patent:

UNITED STATES PATENTS

| Number | Name | Date |
|---|---|---|
| 1,293,155 | Martindale | Feb. 4, 1919 |
| 1,459,106 | Knerr | June 19, 1923 |
| 1,479,873 | Schroeder | Jan. 8, 1924 |
| 1,652,896 | Higginson | Dec. 13, 1927 |
| 1,890,985 | Hamblen et al. | Dec. 13, 1932 |
| 2,091,025 | Breer et al. | Aug. 24, 1937 |
| 2,176,502 | Kurth | Oct. 17, 1939 |
| 2,293,044 | Crane et al. | Aug. 18, 1942 |
| 2,341,407 | Xenis et al. | Feb. 8, 1944 |
| 2,357,921 | Xenis et al. | Sept. 12, 1944 |

FOREIGN PATENTS

| Number | Country | Date |
|---|---|---|
| 258,577 | Great Britain | Nov. 3, 1927 |
| 344,961 | Germany | Dec. 2, 1921 |
| 753,329 | France | Aug. 7, 1933 |

Patented Nov. 23, 1948

2,454,394

UNITED STATES PATENT OFFICE 2,454,394

LUBRICATING OIL COMPOSITION

Eugene Lieber, New York, N. Y., and Edward P. Cashman, Bayonne, N. J., assignors to Standard Oil Development Company, a corporation of Delaware No Drawing. Application September 7, 1945, Serial No. 615,081

2 Claims. (Cl. 252—50)

This invention relates to the preparation of novel chemical products and to uses thereof, and more particularly, it relates to the preparation of novel additives for lubricating oil, for serving as pour depressors and as promotion inhibitors.

Pour depressors for waxy mineral lubricating oils have for some time heretofore been made commercially by chemical condensation of aromatic compounds such as naphthalene or phenol with high molecular weight aliphatic materials such as chlorinated paraffin wax or olefins corresponding thereto. One object of the present invention is to make improved products analogous to those in certain respects, e. g. pour-depressing properties, but having the unexpected additional property of being corrosion inhibitors. Another object of the invention is to make pour depressors from a class of materials not heretofore ever used for such purpose.

Broadly, the present invention comprises chemically condensing an aromatic compound with an aliphatic nitrile. The reaction is preferably carried out in the presence of a Friedel-Craft catalyst.

The aromatic compound to be used should be one containing at least one reactive nuclear hydrogen atom, and is preferably selected from the class consisting of aromatic hydrocarbons and hydroxy and amino derivatives thereof. Suitable examples of such compounds include naphthalene, anthracene, phenanthrene, benzene, toluene, xylene, amyl-benzene, phenol, cresol, naphthol, amyl-phenol, aniline, xylidine, etc. as well as mixtures thereof or crude commercial products consisting essentially of such compounds, e. g. coal tar aromatics, including hydrocarbons, phenols, etc., mixed aromatic hydrocarbon fractions obtained from petroleum by various means such as cracking, solvent extraction, etc., mixed petroleum phenols which have a composition averaging about that of a butyl-phenol, etc.

The aliphatic nitrile to be used may be any having the general formula $R(CN)_n$, where R is a hydrocarbon group containing at least two, and preferably at least ten, aliphatic carbon atoms, and selected from the class consisting of alkyl, alkenyl, alkylene, aralkyl, cycloalkyl and similar hydrocarbon groups, and $n$ is a number indicating how many —CN groups are attached to the R group, if the product is a pure compound, or $n$ may be a fractional number indicating the average number of —CN groups in a mixed aliphatic nitrile product. Preferred aliphatic nitriles to be used according to this invention include stearonitrile, palmitonitrile, oleonitrile, lauronitrile, myristonitrile, margaronitrile and the nitriles of mixed fatty acids such as those derived from various natural fats and oils, e. g. beef fat, mutton fat, cocoanut oil, cottonseed oil, etc. An even lower number of carbon atoms may also be used such as capronitrile, valeronitrile, butyronitrile, etc. Some of the substituted aliphatic nitriles which may be used include phenyl-stearonitrile, and nitriles of polybasic acids, e. g. azelayl nitrile, and acids derived from petroleum sources, e. g. naphthenic acids, paraffin wax acids prepared by oxidation of paraffin wax, etc.

In carrying out the reaction, it is preferable to use an inert solvent such as a refined petroleum hydrocarbon fraction such as kerosene, heavy naphtha, etc., or a highly chlorinated lower hydrocarbon such as tetrachlorethane, dichlorbenzene, etc. If such solvent is used, ordinarily it is best to use about ½ to 10, preferably about 1 to 5, volumes of solvent per volume of mixed reactants.

The proportions in which the reactants per se should be used may vary to some extent according to the nature of the materials used, but will normally range from about ½ to 5, preferably about 1 to 3, mols of the nitrile per mol of aromatic compound. The reaction is preferably carried out in the presence of a condensation catalyst of the Friedel-Crafts type, and an anhydrous aluminum chloride is the preferred material, although other Friedel-Crafts catalysts may be used such as boron fluoride, tin tetrachloride, titanium tetrachloride, etc.

The temperature at which the condensation is carried out may range normally from about room temperature up to about 300° F., the preferred procedure being to slowly add the catalyst to a reaction mixture consisting of the two reactants together with inert solvent if the latter is used, starting with room temperature and after the reaction has subsided gradually heating the mixture to the desired final temperature for a sufficient reaction time between the approximate limits of about 1 to 5 hours, preferably about 2 to 3 hours. The actual time will of course depend on the reaction temperature. As little or no gas is given off during the reaction, the best way to judge when the reaction has been completed is the general viscosity of the reaction mixture which becomes thicker as the reaction proceeds.

After reaction has been completed, the desired high molecular weight condensation product may be recovered in any suitable manner, but the preferred procedure is to cool the reaction mixture, dilute it with about ½ to 5 volumes of inert solvent, preferably the same as used during the reaction (if any was used), and then the catalyst is neutralized by adding a suitable hydrolyzing agent such as water, alcohol, aqueous caustic soda, aqueous hydrochloric acid, etc. or mixtures thereof. The resultant catalyst sludge is then settled and removed, and the solvent extract containing dissolved condensation products is then submitted to distillation under reduced pressure, such as by fire and steam up to 500° F. or 600° F., to remove solvent, unreacted raw materials, and any low-boiling condensation products, and to recover as distillation bottoms the desired high molecular weight condensation product which is generally a dark-viscous oil or solid.

This condensation product is soluble in waxy mineral lubricating oils, and normally should have an average molecular weight above about 600, and preferably about 1,000 to 5,000. It has been found to be valuable as a polyfunctional lubricating oil additive, since it not only has pour-depressing properties, but also has corrosion inhibiting properties, which are particularly useful in conjunction with a lubricant containing an extreme pressure lubricating agent such as one made by chlorinating a petroleum hydrocarbon fraction, e. g. kerosene or paraffin wax and sulfurizing the resultant chlorinated hydrocarbon with sodium polysulfide, sodium xanthate, or other sulfurizing agents known to the art. When this product is used as a pour depressor in waxy mineral lubricating oils, it may be used in a concentration ranging from about 0.1% to 5% or more, and it should be noted that with this particular pour depressor larger concentrations such as 5% generally give substantially better results than lower concentrations such as 1% and 2%, while this is not true of a number of other pour depressors. When used essentially as a corrosion inhibitor, the desired concentration will vary essentially with the amount and corrosiveness of the extreme pressure lubricating agent or other corrosive constituents of the composition in question, but normally a concentration of 0.1% to 2% or so is sufficient for corrosion preventing purposes. The condensation products of this invention may also be added to various other materials, e. g. Diesel fuel, kerosene, domestic heating oils, petroleum naphthas, or normally solid petroleum fractions such as paraffin wax, petrolatum, etc., as well as other corrosive or wax-containing products such as those containing a major proportion of resins, gums, rubber, synthetic rubbers, or other plastics, etc.

Although the mechanism of the operation of the invention is not well understood, it is believed that since substantially all of the nitrogen present in the aliphatic nitrile raw material is found in the final product, that the chemical reactions involved may first proceed with a condensation of a nitrile molecule on to the nucleus of the aromatic compound, with the resultant formation of an aromatic-aliphatic imine, or the CN group may split off from the nitrile and add directly on to the aromatic nucleus, and also the aliphatic portion of the nitrile may combine with the aromatic nucleus, and then one or more of the resulting products may combine with themselves by auto-condensation or some other polymeric condensation process to build up molecules having an average molecular weight above about 600 and generally above 1,000, which are substantially non-volatile up to at least 500° F. or 600° F. under fire and steam distillation, or up to at least 400° F. under a vacuum corresponding to an absolute pressure of about 10 mm. mercury.

Another possible reaction is the combining of two or more of the fatty acid nitrile molecules through intermediate formation of the imine hydrochloride and subsequent splitting off of HCl, to produce fatty acid imine polymers of the dimer, trimer, and higher stages, and these in turn may combine with some of the other products mentioned hereinabove. A still further possibility is that some products may combine by the splitting out of ammonia, although this does not appear so likely, in view of the relatively high content of nitrogen in the final product.

The objects, advantages and details of the invention will be better understood from a consideration of the following experimental data.

*Example 1*

200 grams of fatty nitrile derived from mixed fatty acids (having an average composition of about $C_{17}$ to $C_{18}$) and 100 grams of naphthalene were dissolved in tetrachlorethane as solvent. Then the mixture was heated to 180° F. and 30 grams of aluminum chloride added slowly over a thirty minute period keeping the temperature at about 200° F. After the addition of the aluminum chloride the reaction temperature was raised to 250° F. and maintained thereat for 2½ hours. At the end of this time the reaction mixture was cooled, diluted with a further quantity of tetrachlorethane and the aluminum chloride neutralized. After settling and removing the aqueous layer the tetrachlorethane solution of the reaction product was distilled by fire and steam to 600° F. to recover the solvent and low boiling products. A bottoms residue comprising 112 grams of a brown viscous oil was obtained as reaction product. An analysis of this material showed it to contain 4.3% nitrogen.

When 5% of this product was blended in a waxy lubricating oil having an initial pour point of +30° F., the pour point was found to be −10° F. These products are effective anti-corrosion materials for lubricating oil systems containing corrosive agents, for example, extreme pressure lubricants. This was tested by adding 1% of the condensation product as prepared as described above in a blend comprising 10% of an E. P. agent made by treating chlorinated kerosene with sodium polysulfide, and 90% of a lubricating oil. This was used as the lubricant in an S. A. E. load bearing machine giving the test piece a thirty second break-in with a twenty pound scale load and subsequently increasing to fifty pounds for five minutes. The test pieces were removed, placed in beakers and set in a closed container over a saturated solution of sodium carbonate for 24 hours. Visual examination of the test pieces for corrosion showed that about 8% of the area was corroded with rust. A control test of the same lubricating oil composition without this condensation product showed a rusted area of about 70%.

*Example 2*

Using the procedure described in Example 1 the following proportion of reagents were submitted to reaction:

Fatty nitriles _____ grams__ 200
Naphthalene _____ do____ 50